(12) United States Patent
Koganezawa et al.

(10) Patent No.: US 6,186,170 B1
(45) Date of Patent: Feb. 13, 2001

(54) OZONE-WATER FEEDING FACILITY

(75) Inventors: Akihisa Koganezawa; Yukio Akahori, both of Shizuoka (JP)

(73) Assignee: Take-One Office, Ltd., Shizuoka (JP)

( * ) Notice: Under 35 U.S.C. 154(b), the term of this patent shall be extended for 0 days.

(21) Appl. No.: 09/307,728

(22) Filed: May 10, 1999

(30) Foreign Application Priority Data

Jun. 19, 1998 (JP) .................................................. 10-172883

(51) Int. Cl.$^7$ ....................................................... C02F 1/78
(52) U.S. Cl. ................. 137/563; 261/36.1; 261/DIG. 42; 210/760
(58) Field of Search ........................... 137/563; 261/36.1, 261/DIG. 42; 210/760

(56) References Cited

U.S. PATENT DOCUMENTS

| | | | |
|---|---|---|---|
| 4,627,924 | * 12/1986 | Coste | 210/760 |
| 4,922,943 | * 5/1990 | Gill | 137/563 X |
| 5,032,290 | * 7/1991 | Yamagata et al. | 137/563 X |
| 5,309,938 | * 5/1994 | Ellgoth et al. | 137/563 X |
| 5,824,243 | * 10/1998 | Contreras | 261/36.1 |
| 5,868,945 | * 2/1999 | Morrow et al. | 210/760 |

OTHER PUBLICATIONS

New U.S. Patent Application filed May 10, 1999, entitled "Automatic Faucet Device For Cleaning Human Body With Ozone–Water", by Akihisa Koganezawa et al., Docket No. 114/405.

* cited by examiner

*Primary Examiner*—John Rivell
(74) *Attorney, Agent, or Firm*—Wenderoth, Lind & Ponack, L.L.P.

(57) ABSTRACT

An ozone-water feeding facility is able to feed ozone-water at a highly-accurately controlled concentration from an ozone-water producing apparatus to a remote service location even under an intermittent usage condition. The facility includes an ozone-water producing apparatus disposed remote from an ozone-water service location; a circulating pipeline extending outwardly from the ozone-water producing apparatus and returning thereto by way of a neighborhood of the service location; and a short branch pipe branched from the circulating pipeline at the above neighborhood. The ozone-water is intermittently introduced from the branch pipe, to thereby supply the ozone-water at a specific concentration to the service location. The facility may preferably include a discharge side ozone-water conditioning portion for diluting the ozone-water intermittently introduced from the short branch pipe into a specific concentration before the supply of the ozone-water to the service location.

10 Claims, 2 Drawing Sheets

OZONE-WATER FEEDING FACILITY

BACKGROUND OF THE INVENTION

Field of the Invention

The present invention relates to an ozone-water feeding facility used for applications in which human bodies, instruments and articles are cleaned with ozone-water for sterilization at working sites associated with medical care, public health, the chemical industry, the food processing industry and the like. In particular, it relates to a facility for feeding ozone-water from an ozone-water producing apparatus to a remote service location by way of a pipeline.

An ozone-water producing apparatus for dissolving ozone gas in water filled in a tank while agitating and circulating the water in the tank is known, for example, from Japanese Patent Laid-open No. Hei 2-7967. The apparatus has a faucet from which ozone-water is discharged to be used, for example, for cleaning hands and fingers of a person.

As a method of feeding ozone-water from an ozone-water producing apparatus to a remote service location, a side stream method is known. For example, in U.S. Pat. No. 5,040,487, ozone-water is fed from an ozone-water producing apparatus to a lake by way of a long transportation pipeline in order to sterilize water in the lake.

In the case where ozone-water is fed from an ozone-water producing apparatus to a remote service location by way of a long pipeline laid therebetween and is intermittently discharged at the service location, a serious problem occurs in that it becomes difficult to keep a specific concentration of the ozone-water. This results from the fact that the half-life of ozone dissolved in water is much shorter than that of any other sterilizer.

The decay of the concentration of ozone-water will be more fully described below. A concentration Cx of ozone-water, which has decayed until the ozone-water having been fed from an ozone-water producing apparatus reaches a remote ozone-water service location by way of a pipeline, is expressed by $$C_x = \{(1/2)^{Kx}\}Co, \text{ with } Kx = \{Lx/(Vx/Sx)\}/T$$

where T is a half-life of ozone in the ozone-water, Co is a concentration of the ozone-water at the outlet of the ozone-water producing apparatus, Cx is a concentration of the ozone-water at the service location, Lx is a length along the pipeline in a region from the ozone-water producing apparatus to the service location, Sx is an average effective cross-sectional area of the pipeline, and Vx is an average flow rate (in volume per unit time) of the ozone-water passing through the pipeline in the region from the ozone-water producing apparatus to the service location. With respect to the half-life T of ozone, data described in "Ozone Yearbook in 1993–1994" published by Kabushiki Kaisha Realize show that T is as short as somewhere from ten to twenty minutes in a usual environment (neutral underwater). Now, it is assumed that the facility is used in a favorable environment with T set at 20 minutes, and the other factors are selected such that Lx is 10 m, Vx is 500 cc/min, and Sx is about 0.5 cm$^2$ (effective inside diameter of the pipeline: 8 mm). Under this assumption, in the case of continuous discharge of the ozone-water, Kx becomes about 1/20. Therefore, the value Cx/Co becomes about 0.966, which means that the decay of the concentration of the ozone-water is negligible in accordance with a usual allowable level. In many cases, however, the ozone-water is intermittently discharged, for example, 100 cc one hour apart. In this case, it takes five hours until the ozone-water flows from the inlet of the pipeline to the outlet of the pipeline. Therefore, the value Cx/Co becomes 1/32768, which means that ozone in the ozone-water is almost lost.

If the ozone-water has entirely lost its sterilizing ability as a result of the reduction in concentration of the ozone-water by the intermittent discharge of the ozone-water, a user who has not been advised of the decay of the concentration of the ozone-water is not aware that the sterilizing ability of the ozone-water is lost, and he may have an illusion that hands and/or fingers of the user are sufficiently sterilized with the ozone-water. This is very hazardous from the viewpoint of health conservation.

On the other hand, a user having recognized such a problem will inconveniently throw away the initial part of the ozone-water before every use of the ozone-water. Such action creates wasted time and gives rise to wasted ozone-water. For example, in the above configuration of the facility, to intermittently use the ozone-water at a specific concentration, about 500 cc of the initial part of the ozone-water remaining in the flow passage having a length of 10 m is thrown away, and the subsequent part of the ozone-water is used during every usage of the ozone-water. This not only takes a lot of labor for handling the facility but also causes a large waste of the ozone-water, that is, 500 cc of the ozone-water are wasted for every 100 cc of the ozone-water used.

The above throw-away of the initial part of the ozone-water until the discharge of the subsequent part of the ozone-water having a specific concentration presents another problem. The thrown-away initial part of the ozone-water, particularly, the latter half of the thrown-away initial part has a concentration lower than the desired concentration, but it contains ozone in an amount not negligible in terms of influence to a human body or peripheral environment. Therefore, the facility must be provided with equipment for rendering the thrown-away ozone-water harmless. This requires an excess space for provision of the equipment and an excess cost for production of the equipment.

In the case described in the above document, U.S. Pat. No. 5,040,487, it is conjectured that ozone-water may be discharged in the lake in the form of non-controlled effluent. Consequently, it may be considered that the rate of continuous discharge of the ozone-water becomes significantly large, and therefore, a large problem does not occur. As is apparent from the above description, if the ozone-water is intermittently discharged in the case described in U.S. Pat. No. 5,040,487, there may occur the above-described problem associated with the reduction in concentration of the ozone-water.

SUMMARY OF THE INVENTION

In view of the foregoing, the present invention has been made, and an object of the present invention is to provide an ozone-water feeding facility capable of highly reliably, effectively rendering usable ozone-water at a specific concentration at an arbitrary timing including intermittent discharge, even at a service location remote from an ozone-water producing location.

To achieve the above object, according to the present invention, there is provided an ozone-water feeding facility including an ozone-water producing apparatus, a circulating pipeline, a circulating pump, and a branched discharge passage.

The ozone-water producing apparatus dissolves ozone gas in water and stores the ozone-water. The circulating pipeline extends from the ozone-water producing apparatus to a neighborhood of an ozone-water service location remote from the ozone-water producing apparatus. The circulating pump for press-feeds the ozone-water from the ozone-water producing apparatus into the circulating pipeline so as to circulate the ozone-water through the circulating pipeline. The branched discharge passage, branched from the circulating pipeline, discharges the ozone-water from the circulating pipeline and puts the ozone-water in service.

The circulating pump is operated in such a manner that a value K defined by K={L/(V/S)}/T satisfies a requirement expressed by $$C1 \leq C0/2^K \leq C2$$

where T is a half-life of ozone in the ozone-water, C0 is a concentration of the ozone-water at the outlet of the ozone-water producing apparatus, C1 is a desired lower concentration limit of the ozone-water at the neighborhood, C2 is a desired upper concentration limit of the ozone-water at the neighborhood, L is a length along the pipeline from the outlet of the ozone-water producing apparatus to the neighborhood, S is an average effective cross-sectional area of the circulating pipeline in the region from the outlet of the ozone-water producing apparatus to the neighborhood, and V is an average flow rate (expressed in volume per unit time) of the ozone-water passing through the circulating pipeline in the region from the outlet of the ozone-water producing apparatus to the neighborhood.

The ozone-water producing apparatus is operated to dissolve ozone gas in water in such a manner as to compensate for an amount of ozone lost during circulation of the ozone-water through the circulating pipeline.

The branched discharge passage may be preferably replaced with a plurality of branched discharge passages. In addition, the above facility may preferably include a mixing/diluting portion capable of diluting the ozone-water with diluent water at the branched discharge passage.

The ozone-water at a specific concentration may be preferably supplied by controlling a ratio between a flow rate of the diluent water introduced into the diluting portion and a flow rate of the ozone-water introduced from the branched discharge passage into the diluting portion.

The ozone-water at a specific concentration may be also preferably supplied by controlling a ratio between a total time required for introducing the diluent water into the diluting portion and a total time required for introducing the ozone-water from the branched discharge passage into the diluting portion.

BRIEF DESCRIPTION OF THE DRAWINGS

An ozone-water feeding facility of the present invention is illustrated schematically in the accompanying drawings in which.

DETAILED DESCRIPTION OF PREFERRED EMBODIMENTS

Figure 1:
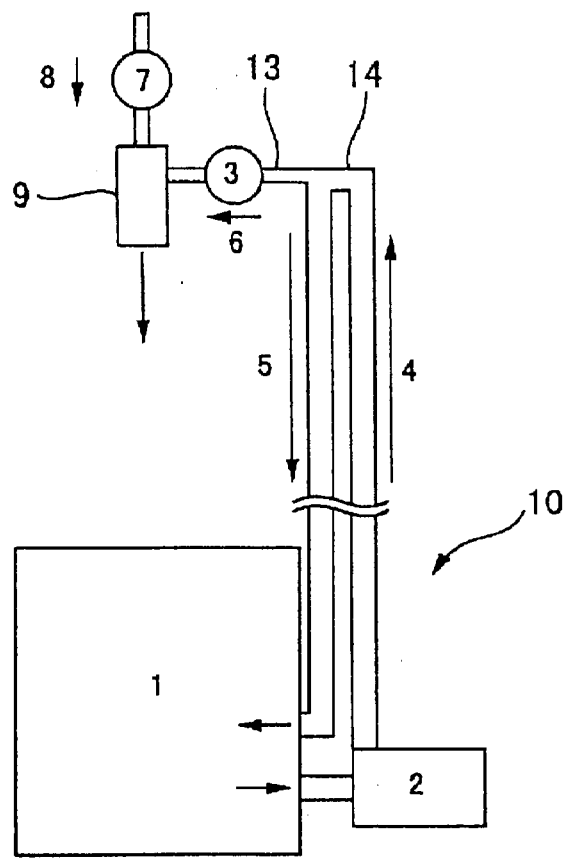
FIG. 1 is a schematic configuration diagram of an ozone-water feeding facility according to one embodiment of the present invention.

The schematic configuration of an ozone-water feeding facility 10 according to one embodiment of the present invention is shown in FIG. 1. The facility 10 has a circulating pipeline 14, extending from an ozone-water producing apparatus 1 to a neighborhood of a remote ozone-water service location, for transporting ozone-water to the neighborhood. A branched discharge pipe 13 has a short length, is branched from the circulating pipeline 14, and has a discharge side ozone-water control means 3. A diluting means 9 for diluting ozone-water with water, and a diluent water control means 7 for feeding a controlled amount of water to the diluting means 9 are also provided. The ozone-water producing apparatus 1 has an ozone gas dissolving portion (not shown) capable of dissolving ozone gas in water for producing ozone-water. The circulating pipeline 14 is basically composed of a going route 4 and a return route 5, each of which extends between the ozone gas dissolving portion and the above neighborhood. The circulating pipeline 14 also has a flow rate control means 2 for controlling the flow rate of the ozone-water flowing through the circulating pipeline 14. In the figure, reference numeral 6 designates the flow of the ozone-water through the branched discharge pipe 13, and 8 designates the flow of the diluent water.

It may be desirable that at least part of the circulating pipeline 14 be configured to have a heat-insulating structure. For example, part of the circulating pipeline 14 may be covered with a heat-insulating member or may be made from a heat-insulating structural material. Alternatively, part of the circulating pipeline 14 may be configured to have a vacuum double pipe structure insofar as the cost for provision of the vacuum double pipe is within an allowable economical limit. With the above configuration, the circulating pipeline 14 can be prevented from being affected by a variation in peripheral temperature. This reduces an error in the concentration of the discharged ozone-water relative to the setting concentration.

The flow rate control means 2 in this embodiment has a combination of a pump operable with a specific motive power and a flow regulating valve. However, the control means is not limited thereto. Any other known flow rate control means may be adopted in principle insofar as it withstands corrosion attack of ozone-water. Additionally, at least one of the pump and the flow regulating valve may be preferably configured to be adjusted on the user side or to be rendered recursive in order to further improve the accuracy of the concentration of ozone-water fed by the facility 10 or to flexibly keep up with the variable usage condition and/or peripheral condition. In any case, it should be understood that in order to achieve the basic effect of the present invention, it is sufficient for the flow rate control means 2 to perform specific control of the flow rate in such a manner as to satisfy the following requirement. That is to say, according to the present invention, it is essential that the flow rate control means 2 is operated in such a manner that a value K defined by K={L/(V/S)}/T satisfies a requirement expressed by $$C1 \leq C0/2^K \leq C2$$

where T is a half-life of ozone in the ozone-water, C0 is a concentration of the ozone-water at the outlet of the ozone-water producing apparatus, C1 is a desired lower concentration limit of the ozone-water at the neighborhood, C2 is a desired upper concentration limit of the ozone-water at the neighborhood, L is a length along the pipeline from the outlet of the ozone-water producing apparatus to the neighborhood, S is an average effective cross-sectional area of the circulating pipeline in the region from the outlet of the ozone-water producing apparatus to the neighborhood, and V is an average flow rate (expressed in volume per unit time) of the ozone-water passing through the circulating pipeline in the region from the outlet of the ozone-water producing apparatus to the neighborhood.

If parts of ozone-water having a plurality of concentrations are required to be discharged at arbitrary timings, a plurality of discharge side ozone-water control means 3, each having a shut-off valve and a flow regulating means, may be selectively disposed parallel to each other. That is, the shut-off valve and the flow regulating means are separate from each other. They are set in such a manner as to control the concentrations of parts of the ozone-water passing therethrough at different values. With this configuration, parts to be discharged of the ozone-water having desired concentrations can be selectively obtained in real time by selectively opening/closing one or more of the shut-off valves provided in the plurality of control means 3. Alternatively, a plurality of diluent water control means 7 on the diluent water feeding side may be similarly configured to be selectively disposed in parallel to each other. In each of these configurations, the ozone-water at a specific concentration is supplied by controlling a ratio between a flow rate of the diluent water introduced into the diluting portion located at the branched passage and a flow rate of the ozone-water introduced from the branched discharge passage into the diluting portion.

If parts of the ozone-water having the further increased concentrations are required to be discharged, it may be difficult to provide the number of discharge side ozone-water control means 3 corresponding to that of the required concentrations. In this case, at least one control means 3 may be controlled such that the shut-off valve is quickly, intermittently opened/closed while the flow rate set at the flow regulating means is kept constant. Thus, the total flow rate and the mixing ratio are controlled. The opening/closing timing of the shut-off valve can be rapidly selected in such a manner as to keep up with the plurality of concentrations even if a number of pieces of hardware are omitted, by selectively storing software data of a plurality of patterns in an electronic control device. Thus, ozone-water at a specific concentration is supplied by controlling a ratio between a total time length during which the diluent water is introduced into the diluting portion and a total time length during which the ozone-water from the branched discharge passage is introduced into the diluting portion.

Figure 2:
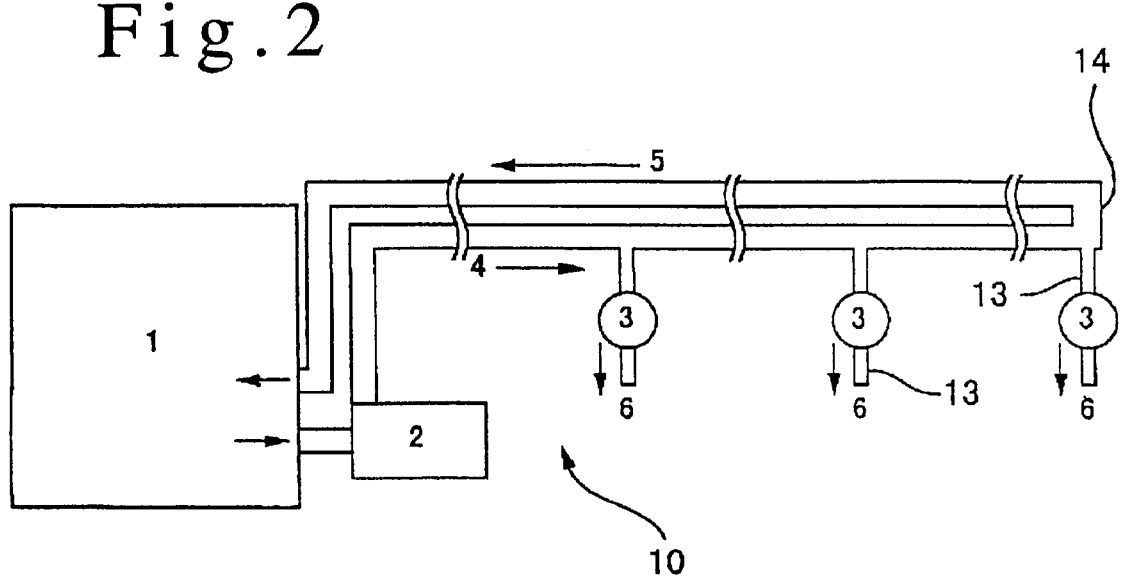
FIG. 2 is a diagram showing a modification of the embodiment shown in FIG. 1.

FIG. 2 shows a modification of the embodiment shown in FIG. 1, in which the branched pipe 13 shown in FIG. 1 is replaced with a plurality of branched pipes. In this modification, it is possible to produce ozone-water at a single location and to distribute the ozone-water to a plurality of service locations.

Figure 3:
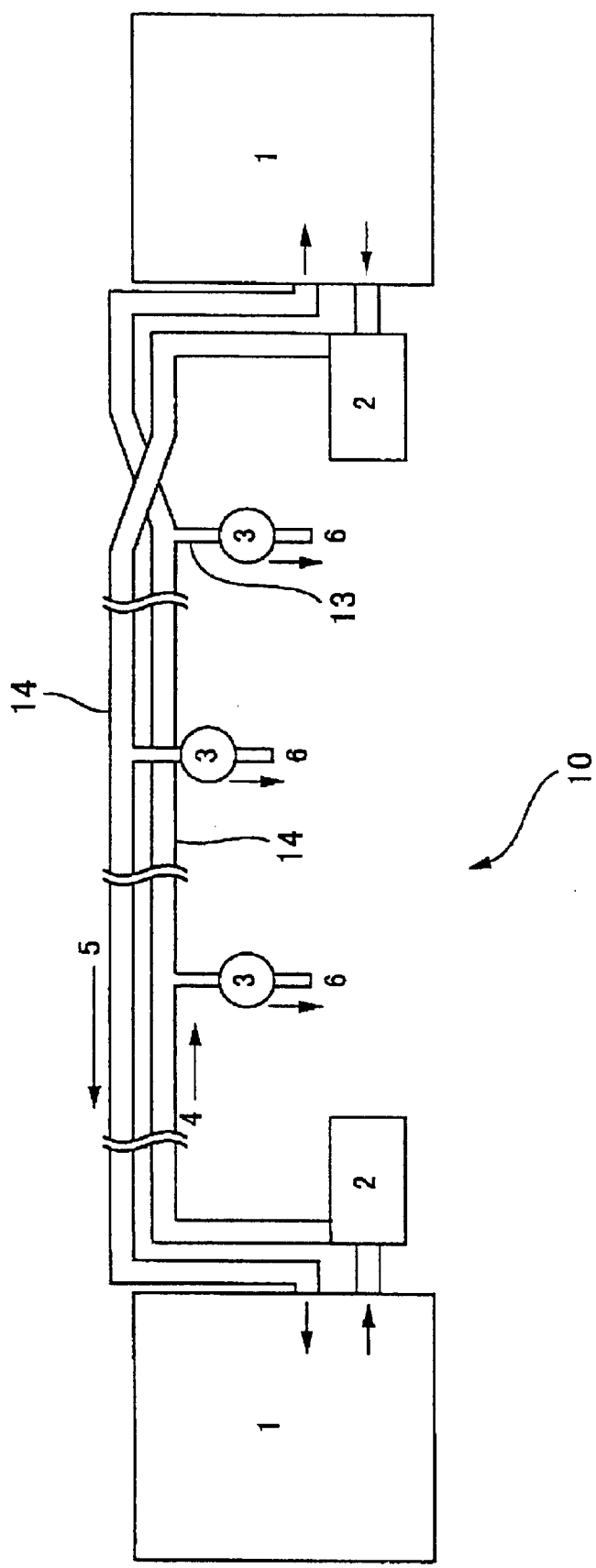
FIG. 3 is a diagram showing a further modification of the modification shown in FIG. 2.

FIG. 3 shows a further modification of the modification shown in FIG. 2 including one circulating pipeline 14 for singly circulating and transporting ozone-water and two ozone-water producing apparatuses connected to the circulating pipeline 14. If it is difficult to ensure a sufficient space for installation of a single ozone-water producing apparatus capable of producing the necessary amount of ozone-water, then first and second ozone-water producing apparatuses capable of producing two-divided parts of the necessary amount of ozone-water, each of which requires a significantly reduced installation space as compared with that of the single type ozone-water producing apparatus, may be connected to the circulating pipeline 14. Alternatively, in the case where the number of service locations is increased after installation of a first ozone-water producing apparatus so that the capacity of the first ozone-water producing apparatus becomes insufficient, a second ozone-water producing apparatus may be connected to the circulating pipeline 14.

The above-described ozone-water feeding facility of the present invention is able to discharge ozone-water at a service location remote from the ozone-water producing apparatus irrespective of usage form (i.e., either continuous usage or intermittent usage at long intervals), and to largely improve the accuracy of the concentration of the discharged ozone-water.

The facility of the present invention is also advantageous in substantially increasing the degree of freedom in an installation space of the facility extending from the ozone-water producing apparatus to a service location, and in layout of the pipeline. Such an advantage of the present invention becomes apparent in comparison with the transportation route of the conventional art facility, which route is intended not to be circulated but to be shortened (that is, strongly intended to be linearly laid out) between the ozone-water producing apparatus and a service location.

According to the present invention, at least part of the transportation pipeline may be made from a heat-insulating material for eliminating the influence of a variation in peripheral temperature. With this configuration, since the half-life of ozone in the ozone-water is stably prolonged, it is possible to significantly reduce the amount of wasted ozone. Incidentally, according to the present invention, even if at least part of the transportation pipeline is not made from a heat-insulating material, the time required for ozone-water fed from the ozone-water producing apparatus to be put in service is made sufficiently shorter than that in the conventional art. Therefore, it is possible to reduce the amount of wasted ozone in the ozone-water and transport the ozone-water at a high concentration with a reduced loss of ozone. The transportation of the ozone-water at a high concentration with the reduced loss of ozone means that even if a volume of the ozone-water transportable per unit time is set at a small value, a sufficient amount of the ozone-water at a sufficient concentration can be supplied at a service location by transporting the ozone-water at a high concentration and diluting the high concentration of the ozone-water into a desired concentration at the service location. Accordingly, although the transportation pipeline according to the present invention is not a one-way type but a circulating type as the basic principle of the present invention and therefore it is made longer than the conventional art one-way type transportation pipeline, such a transportation pipeline of the present invention can have a smaller cross-sectional area in the flow passage than the conventional art one-way type transportation pipeline because the transportation pipeline can transport the ozone-water at a high concentration as described above. In this case, the advantage of making the cross-sectional area of the flow passage smaller overcomes the disadvantage of making the transportation pipeline longer. As a result, according to the present invention, it is possible to save the material (for example, a corrosion-resisting material against ozone, or heat-insulating material) of the transportation pipeline, and also to lay out the transportation along a narrow space. If a general one-way type transportation-pipeline having a usual flow passage is laid out along a circulating route, the amount of the material required for forming the transportation pipeline must be made larger, and a space required for layout of the transportation pipeline must be made larger. From this viewpoint, it becomes apparent that the present invention exhibits a better-than-expected effect and also exhibits a significantly large practical value.

According to the present invention, if ozone-water is required to be discharged at a plurality of service locations, ozone-water singly produced can be distributed to the plurality of service locations. More specifically, even if the plurality of service locations are spaced from each other at relatively long intervals or even if they are spaced a relatively long distance from the ozone-water producing apparatus, ozone-water can be supplied to the service locations in a state in which a variation in concentration of the ozone-water is kept sufficiently small. In the conventional art facility, if ozone-water is required to be discharged at a plurality of service locations such as patient's rooms, a number of ozone-water producing apparatuses corresponding to the number of services locations are provided. This is disadvantageous in that it takes a considerable cost to provide a ozone-water producing apparatus for each patient room because even a small-sized ozone-water producing apparatus has a limitation in terms of its simplicity. Furthermore, it takes a lot of labor to safely carry out the maintenance of all of the apparatuses. In this regard, it should be understood that the facility of the present invention is very advantageous as compared with the above-described conventional art facility.

In summary, the ozone-water feeding facility of the present invention exhibits the various effects of feeding ozone-water from the ozone-water producing apparatus to a remote service location and discharging, at the service location, the ozone-water having a highly-accurately controlled concentration at an arbitrary timing. The present invention also increases the degree of freedom in layout of the pipeline, and saves the installation space of the facility and the amount of the material required for forming the pipeline. Finally, the present invention distributes the ozone-water to a plurality of service location.

While the preferred embodiments of the present invention have been described using specific terms, such description is for illustrative purposes only. It is to be understood that changes and variations may be made without departing from the spirit or scope of the following claims.

We claim:

1. An ozone-water feeding facility comprising:
    an ozone-water producing apparatus for dissolving ozone gas in water to produce ozone-water, and for storing the ozone-water, said ozone-water producing apparatus being operable to dissolve ozone gas in water so as to compensate for an amount of ozone lost during circulation of the ozone-water;
    a circulating pipeline extending from said ozone-water producing apparatus to a vicinity of an ozone-water service location remote from said ozone-water producing apparatus;
    a circulating pump for press-feeding the ozone-water from said ozone-water producing apparatus into said circulating pipeline so as to circulate the ozone-water through said circulating pipeline, said circulating pump being operable such that a value K defined by K={L/(V/S)}/T satisfies a requirement expressed by:

$C1 \leq C0/2^k \leq C2$, wherein:
    T is a half-life of ozone in the ozone-water,
    C0 is a concentration of the ozone-water at an outlet of said ozone-water producing apparatus,
    C1 is a desired lower concentration limit of the ozone-water at the vicinity of the ozone-water service location remote from said ozone-water producing apparatus,
    C2 is a desired upper concentration limit of the ozone-water at the vicinity of the ozone-water service location remote from said ozone-water producing apparatus,
    L is a length of said circulating pipeline from the outlet of said ozone-water producing apparatus to the vicinity of the ozone-water service location remote from said ozone-water producing apparatus,
    S is an average effective cross-sectional area of said circulating pipeline in the region between the outlet of said ozone-water producing apparatus and the vicinity of the ozone-water service location remote from said ozone-water producing apparatus, and
    V is an average flow rate of the ozone-water passing through said circulating pipeline in the region between the outlet of said ozone-water producing apparatus and the vicinity of the ozone-water service location remote from said ozone-water producing apparatus, wherein the flow rate is expressed in volume per unit time; and
    a branched discharge passage for discharging the ozone-water from said circulating pipeline so as to put the ozone-water in service, said branched discharge passage branching off from said circulating pipeline.

2. The facility of claim 1, further comprising a diluting portion communicating with said branched discharge passage and being operable to dilute the ozone-water with diluent water introduced into the ozone-water at said diluting portion.

3. The facility of claim 2, wherein ozone-water having a specific concentration is supplied by controlling a ratio between a flow rate of the diluent water introduced into the ozone-water at said diluting portion and controlling a flow rate of the ozone-water from said branched discharge passage into said diluting portion.

4. The facility of claim 2, wherein ozone-water having a specific concentration is supplied by controlling a ratio between a total time during which the diluent water is introduced into said diluting portion and a total time during which the ozone-water from said branched discharge passage is introduced into said diluting portion.

5. An ozone-water feeding facility comprising:
    an ozone-water producing apparatus for dissolving ozone gas in water to produce ozone-water, and for storing the ozone-water;
    a circulating pipeline extending from said ozone-water producing apparatus to a vicinity of an ozone-water service location remote from said ozone-water producing apparatus;
    a circulating pump for press-feeding the ozone-water from said ozone-water producing apparatus into said circulating pipeline so as to circulate the ozone-water through said circulating pipeline;
    a plurality of branched discharge passages for discharging the ozone-water from said circulating pipeline so as to put the ozone-water in service, said branched discharge passage branching off from said circulating pipeline; and
    at least one diluting portion communicating with at least one of said branched discharge passages, each of said at least one diluting portion being operable to dilute the ozone-water with diluent water introduced into the ozone-water at said diluting portion.

6. The facility of claim 5, wherein ozone-water having a specific concentration is supplied by controlling a ratio between a flow rate of the diluent water introduced into the ozone-water at said at least one diluting portion and controlling a flow rate of the ozone-water from said branched discharge passages into said at least one diluting portion.

7. The facility of claim 5, wherein ozone-water having a specific concentration is supplied by controlling a ratio between a total time during which the diluent water is introduced into said at least one diluting portion and a total time during which the ozone-water from said branched discharge passages is introduced into said at least one diluting portion.

8. An ozone-water feeding facility comprising:

an ozone-water producing apparatus for dissolving ozone gas in water to produce ozone-water, and for storing the ozone-water;

a circulating pipeline extending from said ozone-water producing apparatus to a vicinity of an ozone-water service location remote from said ozone-water producing apparatus;

a circulating pump for press-feeding the ozone-water from said ozone-water producing apparatus into said circulating pipeline so as to circulate the ozone-water through said circulating pipeline;

a branched discharge passage for discharging the ozone-water from said circulating pipeline so as to put the ozone-water in service, said branched discharge passage branching off from said circulating pipeline; and a diluting portion communicating with said branched discharge passage and being operable to dilute the ozone-water with diluent water introduced into the ozone-water at said diluting portion.

9. The facility of claim 8, wherein ozone-water having a specific concentration is supplied by controlling a ratio between a flow rate of the diluent water introduced into the ozone-water at said diluting portion and controlling a flow rate of the ozone-water from said branched discharge passage into said diluting portion.

10. The facility of claim 8, wherein ozone-water having a specific concentration is supplied by controlling a ratio between a total time during which the diluent water is introduced into said diluting portion and a total time during which the ozone-water from said branched discharge passage is introduced into said diluting portion.

* * * * *